United States Patent [19]

Metz

[11] 4,031,765
[45] June 28, 1977

[54] REVERSING NUT FOR DIAMOND THREAD SCREW

[75] Inventor: Joseph R. Metz, Georgetown, Conn.
[73] Assignee: Norco, Inc., Ridgefield, Conn.
[22] Filed: Mar. 31, 1975
[21] Appl. No.: 563,793
[52] U.S. Cl. .................................................. 74/57
[51] Int. Cl.² ........................................ F16H 25/12
[58] Field of Search ........................... 74/53, 54, 57

[56] References Cited
UNITED STATES PATENTS
1,233,858   7/1917   Farmer .................................. 74/57

FOREIGN PATENTS OR APPLICATIONS
1,183,007   1/1959   France .................................. 145/53

Primary Examiner—Samuel Scott
Assistant Examiner—Wesley S. Ratliff, Jr.
Attorney, Agent, or Firm—H. Gibner Lehmann; K. Gibner Lehmann

[57] ABSTRACT

A reversing nut construction for a diamond thread screw of the type having criss-crossed left- and right-hand grooves, the nut comprising an annular nut body having a through bore to receive the screw, a thread-engaging ball carried by the body and extending into the bore thereof, and a second thread-engaging ball also extending into the bore. The first ball has mounting means which enables it to undergo rolling motion, but is held against axial or lateral movement on the nut body. The second ball also undergoes rolling motion, but is further capable of being shifted axially of the body between oppositely disposed extreme positions, whereby it can travel along the left-hand groove of the screw when it is disposed in one position, or the right-hand groove of the screw when it is disposed in the other position. Yieldable detent means, comprising a pair of spring rings, selectively engage the movable ball and bias it into continuous engagement with the screw, while still enabling it to be shifted axially. Such shifting is accomplished by curved reversing grooves which are disposed at the opposite ends of the screw and which are adapted to engage and shift the movable ball so as to effect a reversal in the axial direction of travel of the nut. For a given relative sense of rotation between the screw and nut, the latter can undergo reciprocating movement between the ends of the screw, with the reversals in the axial direction of travel of the nut being automatically effected.

20 Claims, 31 Drawing Figures

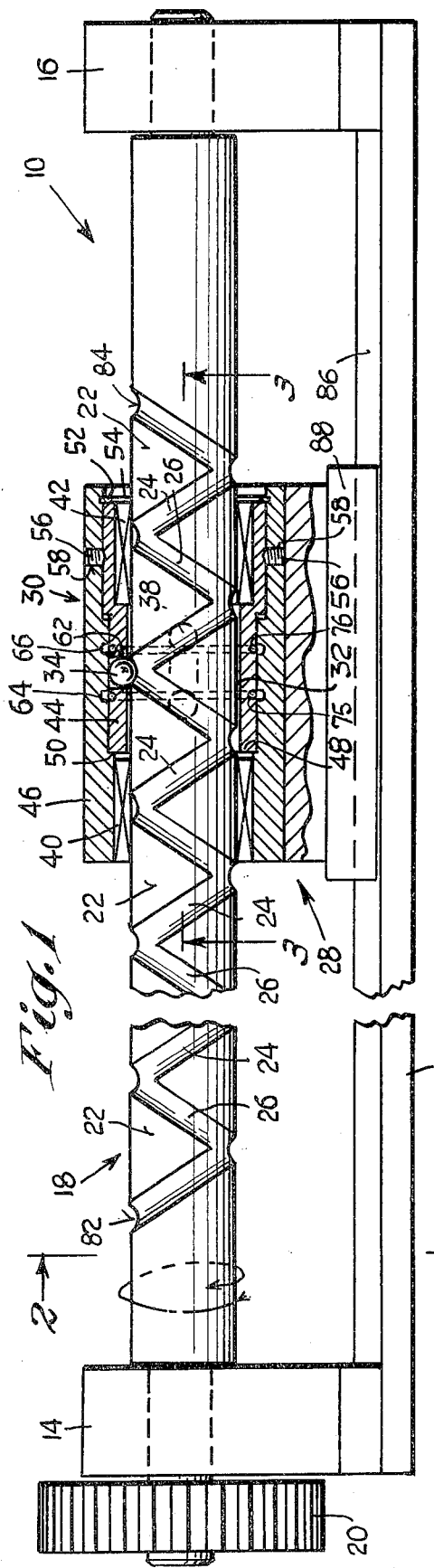
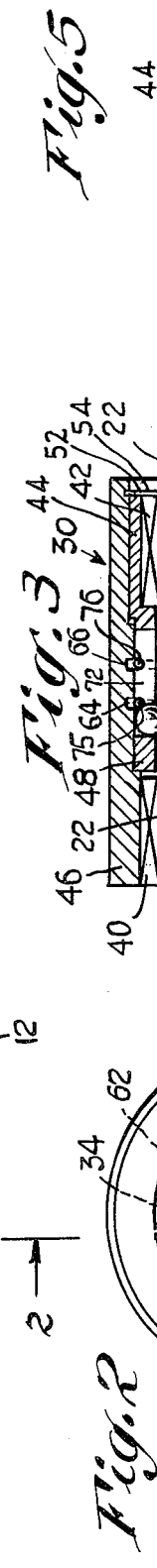
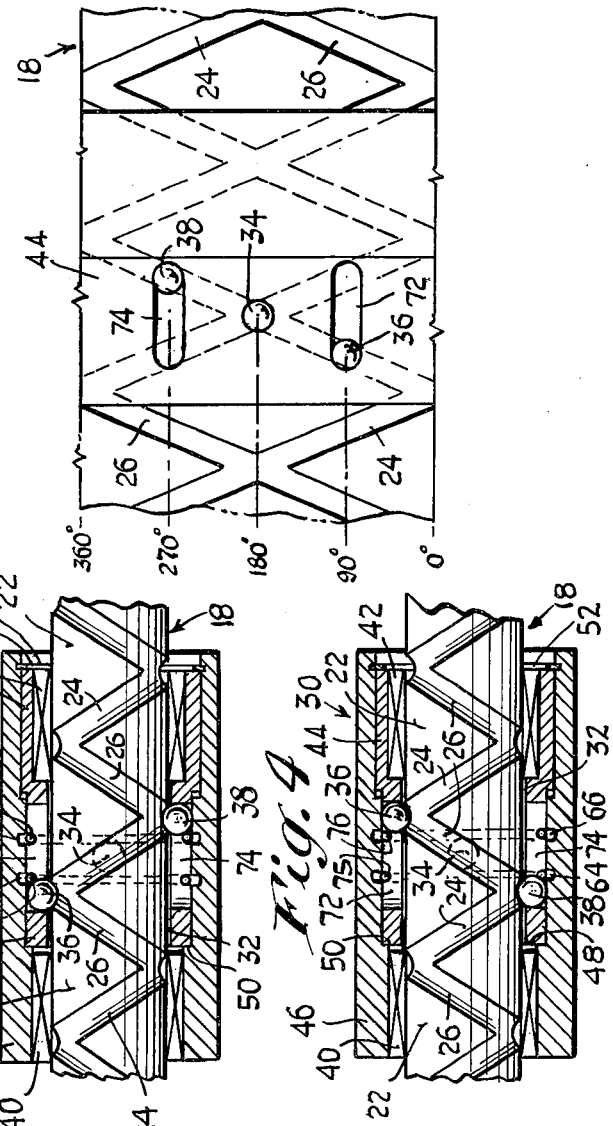
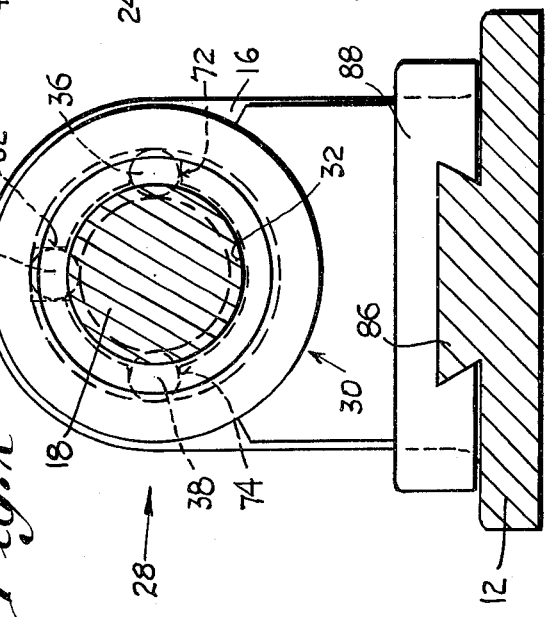

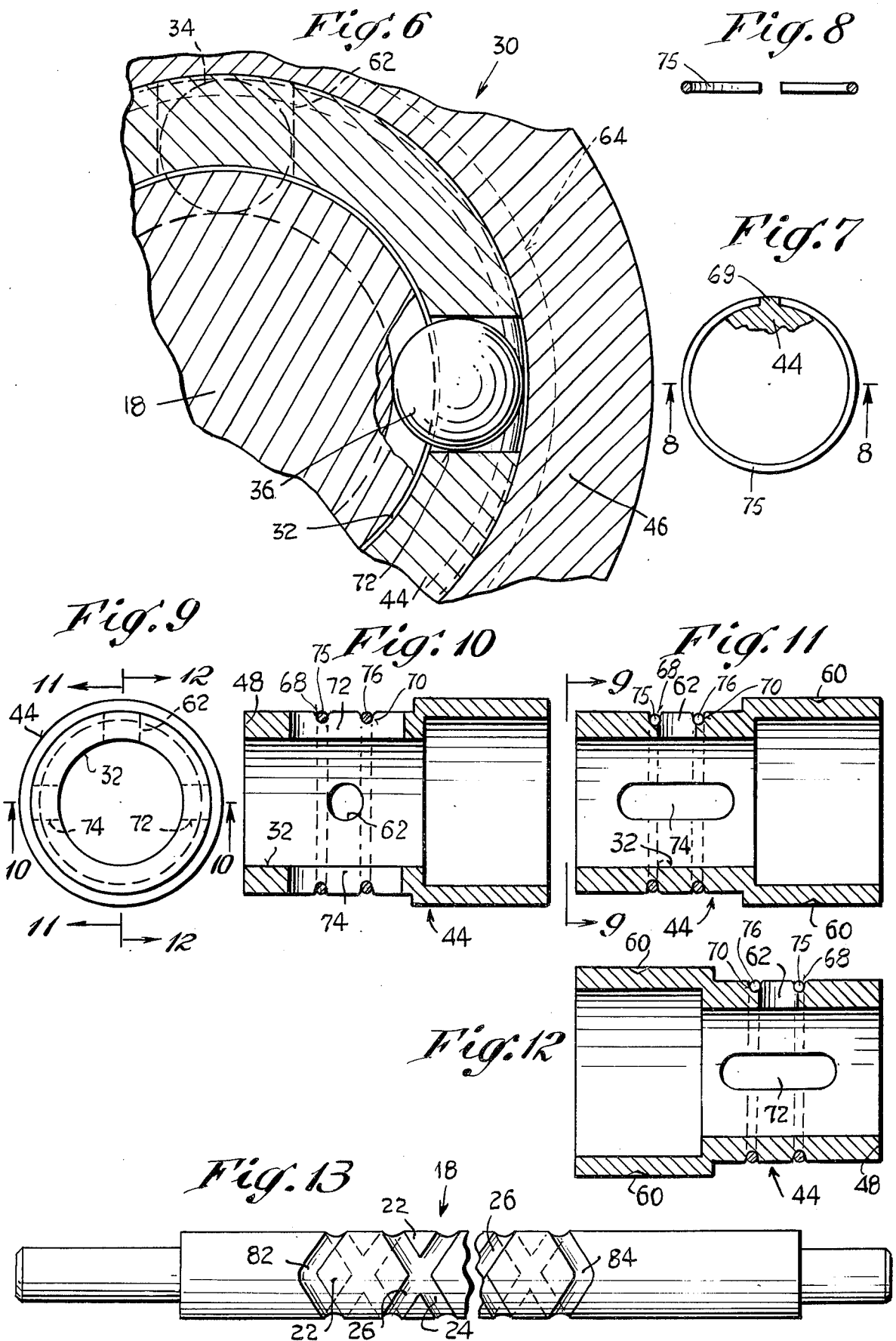

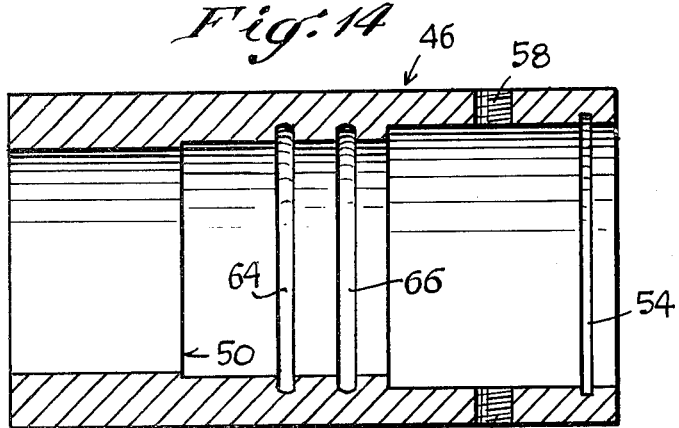
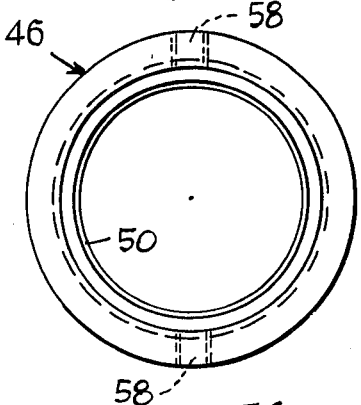
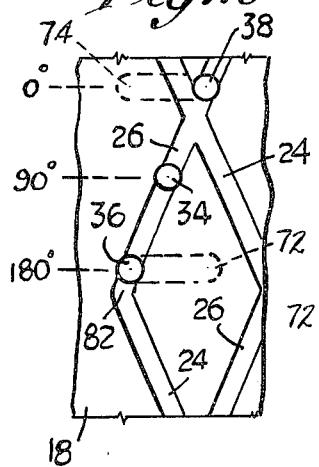
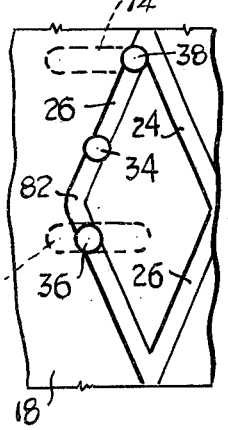
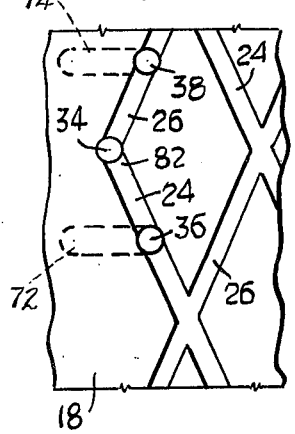
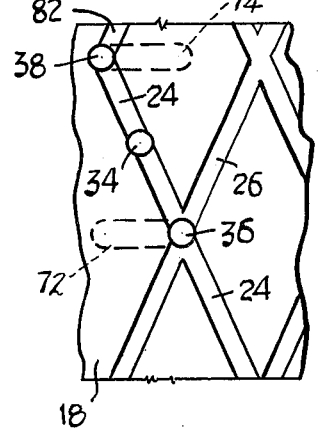
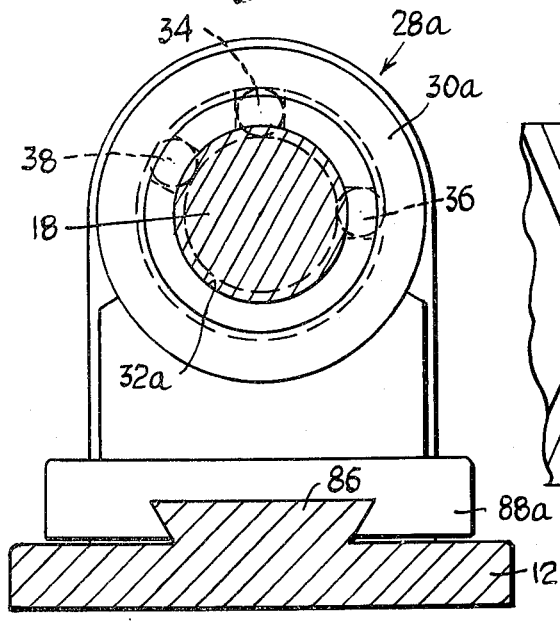
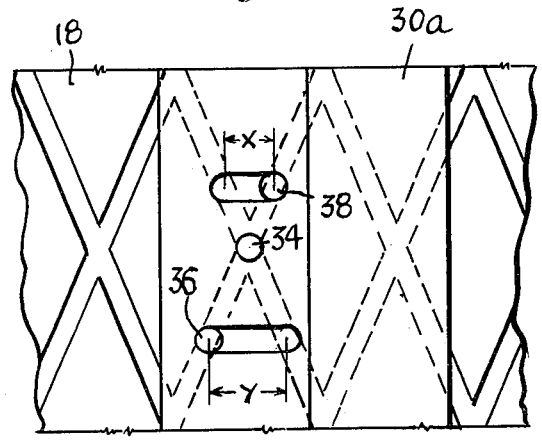

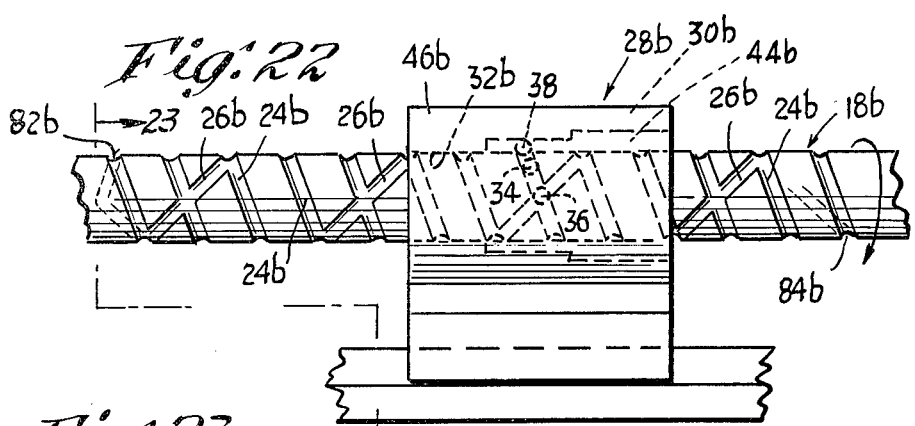
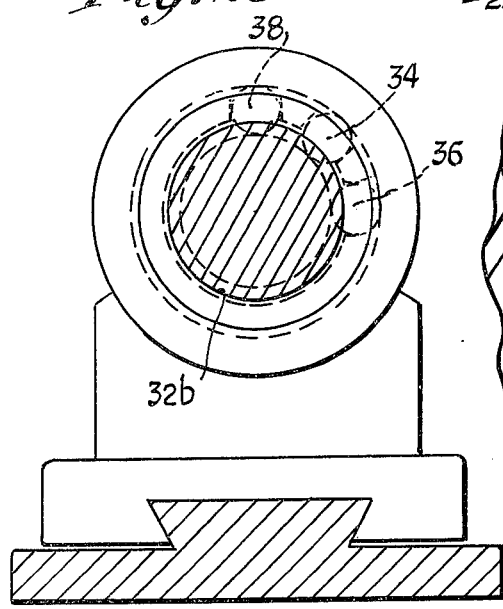
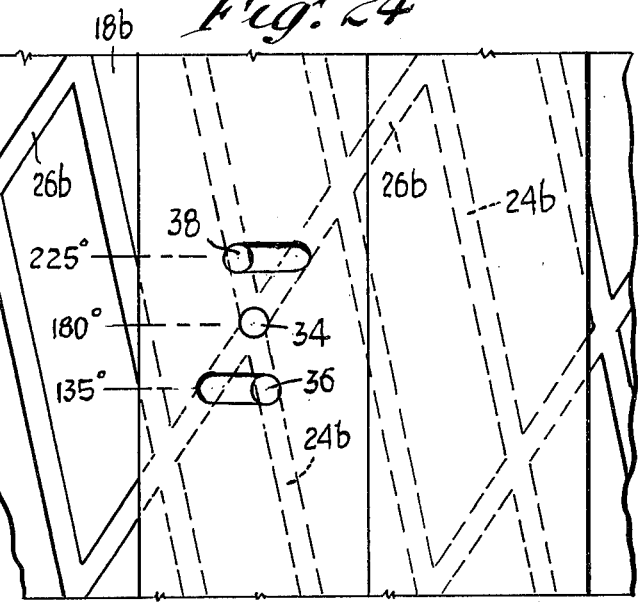
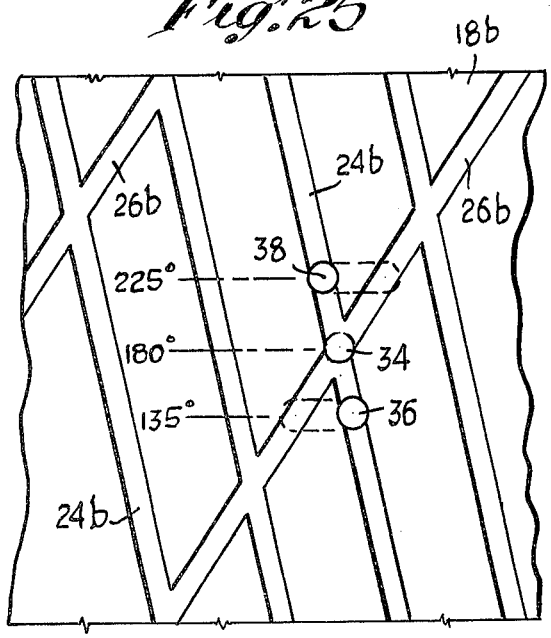
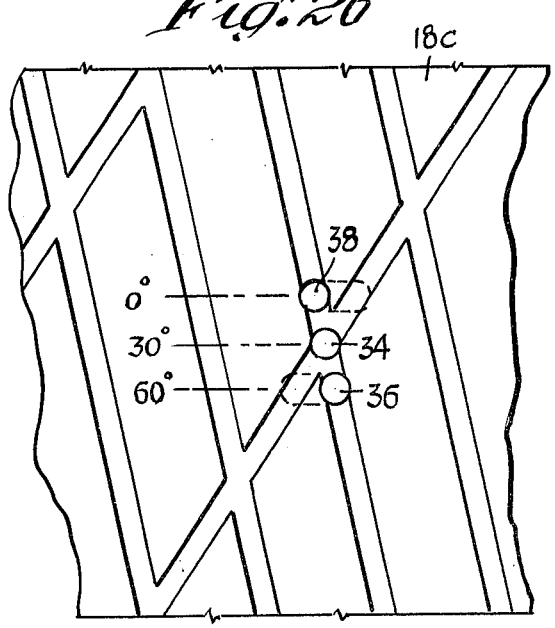

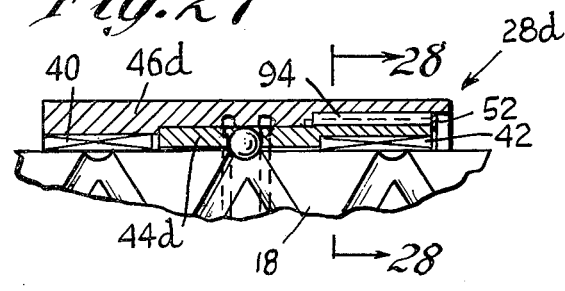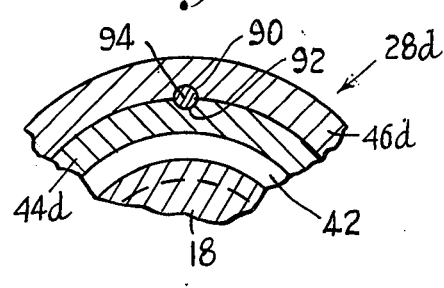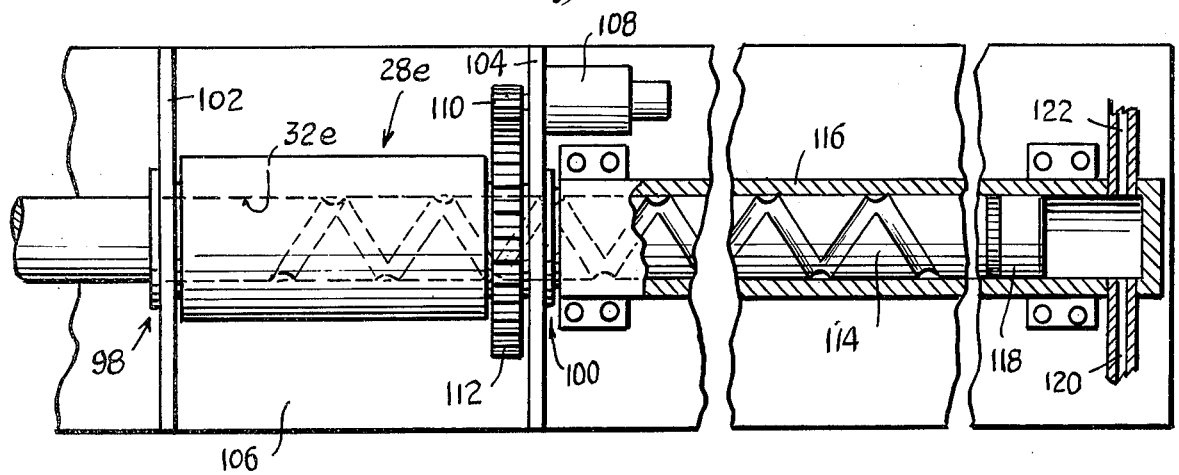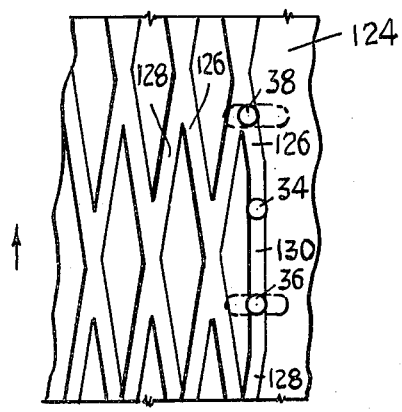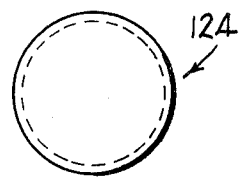

REVERSING NUT FOR DIAMOND THREAD SCREW

BACKGROUND

This invention relates generally to reversing nut constructions for use with diamond thread screws, and more particularly to devices of this type which are especially intended to undergo simple reciprocating movement along the length of the screw, with the reversing movements in the axial direction of travel of the nut being automatically accomplished.

In the past a number of mechanisms have been proposed and constructed for reversing the direction of travel of a nut carried by a diamond thread screw when the nut has reached one end of the screw thread. Such devices generally employed camming grooves having curved reversing edges at the opposite extremities of the screw. One prior construction employed an elongated groove follower which was contoured so as to closely follow the curvature of the grooves in the screw. The length of such a follower was in all cases sufficient to straddle the intersections of the grooves so that it would not jump from a left-hand to a right-hand groove or vice-versa. When these prior followers arrived at the ends of the screw, reversal of the nut could occur, because the reversing end grooves were considerably enlarged to enable the follower to swing from one groove to the oppositely directed groove.

The prior devices, however, had distinct disadvantages. The use of sliding follower members involved considerable friction between the members and the screw, due to the absence of any rolling parts. In addition, the reversing grooves had to undergo special machining in order to be wide enough to accommodate the swinging movement of the follower member as the nut reversed its axial direction of travel. Problems in obtaining proper geometry of such grooves, in order to provide smooth operation, were sometimes difficult to overcome, and the constructions which were proposed often proved too awkward to be physically realized.

Other devices employed merely a single fixed pin extending into the bore of the nut and engaging one of the grooves of the screw. Such devices were generally less than satisfactory in that no reliable drive means for insuring continuity of travel of the pin through the groove intersections was provided. Thus, there was always a danger that the pin might "jump" to the oppositely directed thread groove and thus reverse the nut's axial direction of travel prematurely.

U.S. Pat. No. 3,779,094 discloses a reversing nut construction for a diamond thread screw wherein the nut body incorporates a series of thread-engaging roller elements, one of which is fixed against axial or translational movement on the nut body, while others are capable of undergoing shifting movement respectively between oppositely disposed extreme positions. All of the rollers are carried by needle bearings, with ball-type thrust bearings and bowed spring washers for biasing the rollers into engagement with the screw threads. Those rollers which were axially shiftable were carried on slide blocks, respectively, which were movable in elongate slide grooves arranged parallel to the nut axis. In this later type of construction, virtually all friction which was encountered was of the rolling-type as opposed to the sliding type. As a result, very high efficiency and smooth operation were obtainable.

The present invention relates particularly to improvements in low-friction nut constructions from the standpoint of reduced cost and assembly time, together with greatly simplified structures whereby the manufacturing and assembly costs are less. One of the problems associated with the reversing nut device disclosed in the above identified patent is that the use of multiple needle bearings and thrust-type ball bearings tended to increase the overall cost of the device. In addition, the adjustment of such bearing assemblages tended to be both critical and time-consuming. Special machining was required on the screw in order to precisely form the grooves thereof in a way to accept the conical-shaped nose portions of the roller elements. Also, the slides on which the shiftable rollers were carried represented additional parts which had to be machined to close tolerances in order to insure smooth, trouble-free operation and performance.

SUMMARY

The above drawbacks and disadvantages of prior reversing nut devices are obviated by the present invention which has for an object the provision of an improved reversing nut for a diamond thread screw, which is especially simple in its construction, inexpensive to manufacture and assemble, and which employs an absolute minimum number of separate parts. A related object is the provision of a reversing nut construction as above set forth, which is reliable in its operation and has reduced susceptibility to jamming or malfunction. Still another object of the invention is the provision of a nut follower device which can be employed with a screw of the type having simple, scalloped groove formations that are easier to form than the thread formations previously employed.

The above objects are accomplished by a unique combination of nut body having a through bore to receive a diamond thread screw provided with criss-crossed right-and left-hand grooves of scalloped section, a thread-engaging ball carried by the body and extending into the bore thereof, a second thread-engaging ball which is translationally shiftable on the nut body between oppositely disposed extreme positions, and simple, yieldable detent means directly engaging the second ball to hold it in either of its two extreme positions. The shiftable ball can occupy either the right-hand groove when it is disposed in one of its extreme positions, or else the left-hand groove when it is disposed in the other of its extreme positions. Both balls can thus be made to occupy either groove, thereby enabling selective movement of the nut in opposite axial directions for a given sense of relative rotation between the nut and screw. The arrangement is such that the nut can undergo reciprocating movement between the ends of the screw, with the reversals of axial travel of the nut (or the screw) being automatically effected.

Other features and advantages will hereinafter appear.

In the drawings, illustrating several embodiments of the invention:

FIG. 1 is a view, partly in front elevation and partly in section, of a reversing traverse mechanism incorporating the improved reversing nut of the present invention, the nut having a first thread-engaging ball extending into the bore thereof.

FIG. 2 is a vertical section taken on the line 2—2 of FIG. 1.

FIG. 3 is a view taken on line 3—3 of FIG. 1, showing two additional thread-engaging balls carried in the bore of the nut and being disposed in first extreme positions, respectively.

FIG. 4 is a view like FIG. 3, except showing the two additional thread-engaging balls disposed respectively in their opposite extreme positions.

FIG. 5 is a development of part of the nut and the diamond thread screw of FIG. 1, illustrating the locations of the three thread-engaging balls associated with the nut.

FIG. 6 is an enlarged, fragmentary sectional view of the reversing nut of FIGS. 1–4, particularly illustrating the mounting arrangements for two of the balls carried thereby.

FIG. 7 is a top plan view of one of a pair of annular spring rings as employed in the reversing nut of the present invention, and showing a fragmentary view of a part of the nut body, the rings being adapted to directly engage and yieldably hold the movable balls in oppositely disposed extreme positions.

FIG. 8 is a side elevation of the ring of FIG. 7.

FIG. 9 is a left end elevation of the cage portion of the reversing nut of FIGS. 1–4.

FIG. 10 is a section taken on line 10—10 of FIG. 9.

FIG. 11 is a section taken on line 11—11 of FIG. 9.

FIG. 12 is a section taken on line 12—12 of FIG. 9.

FIG. 13 is a top plan view of the diamond thread screw of FIG. 1, particularly illustrating reversing grooves disposed near the opposite ends thereof for effecting reciprocating movement of the nut.

FIG. 14 is a vertical section of the housing portion of the reversing nut of FIGS. 1–4.

FIG. 15 is a right end elevation of the housing portion of FIG. 14.

FIG. 16 is a development of a portion of the diamond thread screw of FIG. 1, illustrating the relative locations of the three balls associated with the reversing nut as the latter is traveling axially toward the left with respect to a rotating screw.

FIG. 17 is a view like FIG. 16, showing one ball which occupies the leading position being engaged by the edge portions of the reversing groove with the latter effecting a gradual shifting toward the right of the leading ball with respect to the nut.

FIG. 18 is a view like those of FIGS. 16 and 17, wherein the leading ball has been completely shifted to its right-hand extreme position with respect to the nut by the continued movement of the latter toward the left with respect to the screw, whereby reversal in the axial direction of movement of the nut will commence.

FIG. 19 is a view like those of FIGS. 16–18, showing the trailing ball having been shifted toward the left with respect to the nut after the latter has begun moving toward the right with respect to the screw.

FIG. 20 is a view like FIG. 2, except showing a reversing nut comprising thread-engaging balls having non-uniform circumferential spacing between the adjacent balls, this view constituting another embodiment of the invention.

FIG. 21 is a development of the reversing nut and diamond thread screw of FIG. 20, showing the circumferential locations of the three thread-engaging balls associated with the nut.

FIG. 22 is a view, partly in front elevation and partly in vertical section, of another embodiment of the invention, illustrating a diamond thread screw having a left-hand to right-hand pitch ratio of 3:1, and showing a reversing nut adapted for reciprocating movement with respect thereto.

FIG. 23 is a section taken on line 23—23 of FIG. 22.

FIG. 24 is a development of the cage portion of the reversing nut, and diamond thread screw of FIGS. 22 and 23, showing the relative locations of the thread-engaging balls associated with the nut, and particularly illustrating the thread configuration of the screw.

FIG. 25 is a development of the diamond thread screw per se of FIGS. 22 and 23, showing the relative locations of the thread-engaging balls associated with the nut as the latter travels along the screw.

FIG. 26 is a view like FIG. 25, except illustrating the relative locations of thread-engaging balls of a somewhat modified reversing nut, wherein the circumferential spacing between each of the adjacent balls is 30°, this construction constituting another embodiment of the invention.

FIG. 27 is a fragmentary, vertical sectional view of still another embodiment of the invention, showing improved fastener means for connecting a housing portion of a reversing nut with a cage portion thereof.

FIG. 28 is a vertical, fragmentary section taken on line 28—28 of FIG. 27.

FIG. 29 is a view, partly in top plan and partly in section, of still another embodiment of the invention, showing a reversing nut adapted to be held against axial movement while being turnably driven, and a diamond thread screw associated therewith, the latter being adapted to undergo reciprocating movement for imparting power to a piston of the type employed in a fluid pump.

FIG. 30 is a development of a diamond thread screw having a reversing groove characterized by zero pitch and also showing the locations of three thread-engaging balls of a reversing nut associated with the screw, wherein either the nut or the screw can undergo a dwell with respect to the other at the end of a reciprocating stroke.

FIG. 31 is an end elevational view of the screw which is shown as a development in FIG. 30.

Referring first to FIG. 1, there is illustrated a traverse mechanism generally designated by the numeral 10, comprising a frame or base 12 having upright support members 14, 16 constituting end bearings for a diamond thread screw 18. The latter carries a gear 20 at one end, adapted to be engaged by a pinion (not shown) connected to a suitable source of power such as an electric motor. The diamond thread screw 18 comprises thread formations 22 defining criss-crossed grooves 24, 26 of scalloped configuration. As shown in FIG. 1, the grooves 24 are of the right-hand variety, while the grooves 26 are of the left-hand type. The diamond thread screw 18 is adapted for turning movement in either direction, with the opposite ends thereof being supported on the bearings 14 and 16, respectively.

In accordance with the present invention there is provided a novel reversing nut device generally designated by the numeral 28, comprising a nut body 30 having a through bore 32 in which the diamond thread screw 18 is received, and comprising a series of thread-engaging balls 34, 36 and 38 extending into the bore 32 and adapted to be received in the thread grooves 24 or 26. Also disposed in the bore 32 are needle bearings 40, 42 for engagement with the broad lateral surface of the diamond thread screw 18, in order to reduce friction between the nut and screw as the latter rotates.

The needle bearings 40, 42 are of conventional construction, having inner races and outer races, and are preferably press fitted into the nut body 30.

The reversing nut shown in FIGS. 1–4 and 6 further comprises an inner part or cage 44, particularly illustrated in FIGS. 9–12, and an outer part or housing 46, shown in FIGS. 14 and 15. The cage 44 is adapted to be telescopically received in the housing 46 as shown in FIGS. 1, 3 and 4. The inner end surface 48 of the cage 44 is adapted to butt against a corresponding internal annular shoulder 50 (FIG. 14) of the housing 46 when the two parts are assembled together. A retainer snap ring 52 is receivable in an annular groove 54 on the inner wall of the housing 46 so as to permanently retain the cage 44 therein. Set screws 56, which are disposed in a pair of radially extending, threaded holes 58 in the housing, are received in corresponding dimpled formations 60 on the outer surface of the cage 44 to thereby hold the latter captive within the housing.

Referring for the moment to FIGS. 9–12, the cage 44 has a transverse passage 62 through the annular wall thereof. This passage is adapted to receive the ball 34, thus restraining it against axial movement with respect to the cage but enabling free rotational movement thereof. Disposed on opposite sides of the passage 62 are two diametrically opposed longitudinal slots 72, 74 (FIGS. 12 and 11, respectively), each having a width slightly greater than the diameter of the balls 36, 38. The slots 72, 74 extend completely through the annular wall of the cage 44.

Referring again to FIGS. 1, 3 and 4 and in accordance with the present invention there are provided yieldable detent means engageable with the ball 36 for holding it in either of two oppositely disposed extreme positions, the detent means comprising a pair of spring rings 75, 76, one of these being illustrated in FIGS. 7 and 8.

In accordance with the present invention, the outer surface of the cage 44 is provided with two grooves 68, 70 extending virtually around its periphery, said grooves being axially spaced from one another as shown in FIGS. 10–12. It can be seen that the grooves intersect the two slots 72, 74 transversely, and provide seats respectively for the two spring rings 75, 76. The spring characteristic of each ring enables it to be merely snapped into the corresponding groove before the cage 44 is inserted into the housing 46. As shown particularly in FIG. 14, corresponding annular clearance grooves 64, 66 are provided on the inner surface of the housing 46. The latter grooves preferably although not necessarily have a slightly greater width than the grooves 68, 70 and are intended to provide limited clearance for the spring rings 75, 76 respectively, when side portions of the latter are momentarily urged radially outward by either of the two movable balls 36, 38, as will be explained more fully below.

FIG. 3 shows the ball 38 disposed in one extreme position, with its other extreme position being illustrated in FIG. 4. Similarly, FIG. 3 shows the ball 36 disposed in one of its extreme positions, with its other extreme position also illustrated in FIG. 4. By such an arrangement in can be seen that the three balls 34, 36 and 38 are all aligned, and occupy the groove 26 for the relative positions illustrated in FIG. 3, whereas in FIG. 4, all three balls are disposed in the oppositely directed groove 24. Thus, for a given sense of relative rotation of the screw with respect to the nut, the latter can undergo movement in opposite axial directions with respect to the screw, depending on the relative positions of the "movable" balls 36, 38.

In accordance with the present invention, the diamond thread screw 18 is further provided with a plurality of curved reversing grooves 82, 84 disposed respectively at its opposite ends. These grooves are particularly shown in FIG. 13 and operate to effect the initial shifting of the leading ball, which subsequently results in reversal of the axial direction of movement of the nut.

As can be readily seen in FIG. 3, the spring ring 75 engages the ball 36 when the latter is disposed in its left-hand extreme position and the ring 76 engages the ball 38 for the right-hand extreme position (of ball 38). Similarly, the ring 75 engages the ball 38 when the latter is disposed in its left-hand extreme position, with the ring 76 engaging the ball 36 for the right-hand position (of ball 36). As the movable ball 36 is shifted from one end of its slot 72 to the other end thereof by the reversing grooves 82, it momentarily causes the spring ring 75 (and subsequently the other spring ring 76) to yield in a radially outward direction (which is made possible by the corresponding clearance groove 64). Also, shifting of the other movable ball 38 involves by-passing both spring rings 75, 76 in succession, in the reverse order. As particularly shown in FIG. 7, the groove 68 preferably has an abutment portion 69 constituting a stop, engageable with the ends of the spring ring 75 to prevent the latter from rotating in the slot. Such an arrangement insures that only the desired portions of the ring engage the movable balls 36, 38. A similar abutment portion (not shown) can be provided in the remaining groove 70, in order to prevent the ring 76 from rotating.

FIG. 1 illustrates a typical arrangement of traverse mechanism wherein the diamond thread screw 18 is adapted to be rotatably driven, and wherein the nut 28 is held against rotation by means of a slide bar 86, which is substantially parallel and coextensive with the screw 18, and a slide bar follower 88 which is carried by the nut. By such an arrangement, the latter can undergo axial movement with respect to the screw, but is held against rotation.

The operation of the improved reversing nut can now be readily understood by referring to FIGS. 5 and 16–19. For purposes of explanation, it will be assumed that the ball 38 is disposed in its right-hand extreme position as shown in FIG. 5. These are the same relative positions as shown in FIGS. 1 and 3. With the screw rotating in the direction indicated in FIG. 1, it will be seen that the balls 34, 36, 38 all occupy the left-hand groove 26 of the diamond thread screw 18. Such rotation will give rise to movement of the reversing nut 30 toward the left in FIGS. 1 and 5. FIGS. 16–19 show a development of the screw, with the positions of the balls being indicated by solid lines, and the oppositely disposed extreme positions of balls 36, 38 being designated by dotted lines. Under the above circumstances, the reversing nut 30 will be traveling toward the left in FIG. 16. Reversal in the axial direction of movement is effected by the engagement of the leading ball 36 with the left-hand reversing groove 82. Such engagement is illustrated in FIG. 17. As this occurs, it can be seen that this leading ball 36 is shifted with respect to the nut toward the right, while the nut continues to travel toward the left due to the engagement of the fixed ball 34 and the wall of the groove 26. Continued rotation of the screw gives rise to further movement of the nut toward the left such that the fixed ball 34 and the movable balls 36, 38 will eventually assume the positions illustrated in FIG. 18. It is at this point that the axial direction of movement of the nut begins to reverse, since the ball 36 has reached its opposite extreme position and begins to carry the nut toward the right; similarly in FIG. 19, further rotation of the screw will effect additional movement of the nut toward the right, thus shifting the trailing ball 38 toward the left with respect to the nut 30. Such shifting of this trailing ball occurs because both the fixed ball 34 and the one movable ball 36 are carrying the nut toward the right, and the trailing ball 38 is confined to switch from the left-hand groove 26 to the right-hand groove 24 in the vicinity of the reversing surface 82. From the position of FIG. 19, the nut will continue traveling toward the right until it arrives at the location of the right-hand reversing groove 84 (FIG. 13). Upon its arrival, the leading ball 36 will be engaged by the reversing groove 84 and shifted toward the left thereby, thus effecting a second reversal of axial direction of travel with respect to the screw. The reversing nut thus undergoes a simple reciprocating movement between the extremities of the diamond thread screw, as determined by the particular locations of the reversing grooves 82, 84.

With the nut traveling toward the right as in FIG. 19, any load applied thereto (in a direction tending to oppose its movement) is carried by the balls 34, 36 when neither is at a groove intersection. When either of the balls 34, 36 crosses a groove intersection, the load is carried by the other until the intersection is passed. The arrangement is such that at least one ball is available to carry the load at all times.

Another embodiment of the invention is illustrated in FIGS. 20 and 21, showing an arrangement for a reversing nut wherein the circumferential position of one of the movable balls has been shifted such that it is disposed at a smaller angle with respect to the circumferential position of the fixed ball than the 90° arrangement of the first embodiment. As in the previous embodiment, the nut 28a comprises a nut body 30a having a through bore 32a to receive a diamond thread screw 18. Extending into the bore 32a is a thread-engaging ball 34, together with a pair of axially shiftable balls 36, 38. The nut 28a carries a slide bar 88a which is adapted to move along a slide similar to that designated 86 in FIG. 1.

As illustrated in FIG. 20, the circumferential position of the shiftable ball 38 is not orthogonal to the circumferential position of the fixed ball 34. Instead, the two are disposed at roughly a 60° angle with respect to one another. FIG. 21 is a development of the reversing nut arrangement of FIG. 20, more clearly showing the relative positions of the thread-engaging balls. The only modification in the particular configuration of the slots and recesses in which the balls 36, 38 move is that the spacing between the oppositely disposed extreme positions of the ball 38, indicated by the dimension "X", is somewhat less than the spacing between the oppositely disposed extreme positions of the ball 36, indicated by the dimension "Y". This results from the reduced axial displacement required by the ball 38 as it is being shifted from one groove to the oppositely directed groove. This reduced displacement results from the closer circumferential spacing on the nut body between the ball 38 and ball 34, as can be understood by reference to FIG. 21. The operation of this embodiment is otherwise similar to that illustrated and described in connection with FIGS. 1-19, and need not be discussed further. By such an arrangement, increased flexibility can be realized in that additional space around the periphery of the nut can be made available for attachment to other equipment such as carriages, actuator arms, etc. (not shown). It is to be noted that no particular significance should be attached to the 60° angle spacing shown in FIG. 20; several other orientations between circumferential positions of the various balls could readily be employed with equally good results.

Another embodiment of the invention is illustrated in FIGS. 22-25. FIG. 22 shows a reversing nut 28b for engagement with a modified diamond thread screw 18b wherein the latter has criss-crossed grooves 24b and 26b, with the latter having a pitch of roughly three times that of the groove 24b. As in the previous embodiment, the nut 28b comprises an annular nut body 30b having a through bore 32b to receive the screw 18b. A thread-engaging ball 34 extends into the bore 32b and is mounted against movement in an axial direction with respect to the nut, but is capable of free-turning (rolling) movement. In addition, a pair of shiftable balls 36, 38 extends into the bore 32b also for engagement with the walls of the grooves of the screw. The mounting arrangement for the ball 34 is similar to that shown in FIG. 1, wherein it is carried in a radially extending recess in the cage portion 44b of the nut body. The balls 36, 38 are capable of moving axially of the nut body, and are retained in either of their oppositely disposed extreme positions by suitable spring rings (not shown), similar in configuration to those discussed in connection with the embodiment of FIG. 1.

In addition to the cage portion 44b, the nut body comprises a housing portion 46b in which the cage portion is telescopically received. As in the first embodiment, end bearings (not shown) are provided to centralize the screw with respect to the nut body as the two parts undergo relative turning movement. As shown particularly in FIGS. 23-25, the circumferential positions of each of the two shiftable balls 36, 38 with respect to the ball 34 about the nut periphery is roughly 45°. This reduced spacing insures that during travel, at least two of the three balls occupies one of the grooves 24b, 26b at all times, in order to prevent jumping of one of the balls to the oppositely directed groove at a groove intersection.

As shown in FIG. 24, the ball 36 is shiftable between oppositely disposed extreme positions, one extreme position being nearer one end of the nut than the location of the ball 34, and the other extreme position being nearer the other end of the nut than the location of the ball 34. The other shiftable ball 36 is similarly movable between oppositely disposed extreme positions as shown. The extreme positions are so chosen as to enable the three balls 34, 36, 38 to occupy either the groove 24b having the lower pitch, or the groove 26b having the higher pitch. FIG. 25 illustrates the operation of the reversing nut 28b wherein the nut is non-rotating and the balls 34, 36, 38 all occupy the groove 24b. The positions of the balls in this groove are indicated by the solid lines. With the screw rotating in the direction indicated in FIG. 22, the nut will be traveling axially toward the left. It will be understood that the load on the nut (directed toward the right in FIG. 25) is shared by the balls 34, 38 at such times that either is not disposed at a groove intersection. When one of the balls 34, 38 is disposed at an intersection, the other is not, due to the relatively close (45°) circumferential spacing of the balls about the nut periphery. As a result, one of the two balls is always available to carry the load.

Reversal of the axial direction of travel of the nut is effected by reversing grooves similar to those indicated by numerals 82, 84 of the first embodiment. These are designated 82b and 84b in FIG. 22. As the nut travels toward the left in FIG. 25, the leading ball 38 will eventually arrive at the groove 82b. With the nut continuing its travel for a fraction of a turn of the screw, the ball 38 will be shifted toward the right with respect to the nut. Ball 34 drives the nut to the left during its travel through the groove, with the trailing ball 36 being shifted axially toward the left with respect to the nut as the latter leaves the groove 82b, thus enabling the nut to begin traveling toward the right in FIG. 22 with all three balls 34, 36, 38 riding in the oppositely directed groove 26b. It will be understood that for a given rate of rotation of the screw, the nut will reciprocate at different rates, with the movement toward the right in FIG. 22 occurring at a rate roughly three times the rate of movement toward the left. Reversal of the direction of travel at the right hand reversing groove 84b is analogous to that discussed in connection with groove 82b above. The leading ball 38 is the first to be engaged by the reversing groove 84b, and is shifted thereby toward the left with respect to the nut during the reversal. The trailing ball 36 is then shifted toward the right with respect to the nut as the fixed ball 34 carries the nut through the reversing groove 84b and begins to drive the nut toward the left with respect to the screw. It will be understood that other ratios of thread pitch could be employed in the device of FIG. 22, instead of the 3:1 ratio shown.

Still another embodiment of the invention is shown in FIG. 26, illustrating a development of a diamond thread screw 18c and showing the locations of three thread-engaging balls carried by a further modified reversing nut (not shown). The balls are designated by the numerals 34, 36 and 38. As shown, the circumferential positions of the balls 36, 38 with respect to that of the ball 34 about the periphery of the nut body is roughly 30°. In this instance, the ball 34 is held against axial movement with respect to the nut body, and the balls 36, 38 are capable of being axially shifted with respect thereto. Depending upon the particular configuration of the grooves in the diamond thread screw, it may be desirable to have the angular spacing of the balls as close as in the present case, particularly in instances where the ratio of the groove width to thread crest width is relatively large. In such cases, the close angular spacing eliminates the possibility of any of the balls jumping from one groove to another at the intersections thereof, since the arrangement is such that the adjacent balls can never both be passing adjacent groove intersections at the same time.

Another embodiment of the invention is illustrated in FIGS. 27 and 28, showing a reversing nut construction 28d which is intended to be substituted for the nut 28 of FIG. 1. The nut 28d comprises an inner cage portion 44d and an outer housing portion 46d, the inner cage 44d being telescopically received therein. End bearings 40, 42 are provided to centralize the diamond screw 18 with respect to the nut 28d, and to minimize sliding friction therebetween. By the present invention, there is provided a novel and improved securing means for fastening together the inner cage portion 44d and housing 46d, the means comprising an elongate grooved formation or furrow 90 disposed on the inner surface of the housing 46d, and a corresponding grooved formation or furrow 92 disposed on the outer portion of the cage 44d. Both grooves are coextensive with one another and extend in a generally axial direction with respect to the nut body. With the cage portion 44d received in the housing 46d such that the grooves are aligned with one another, a cylindrical keying pin 94 can be inserted in the cylindrical recess formed by the grooves. Once inserted, the pin prevents relative rotation of the cage with respect to the housing, and is held in place by means of a split ring washer 52. The arrangement of the pin and coextensive grooves eliminates the set screw arrangement in FIG. 1, thus minimizing a slight deformity which tended to occur in the cage portion 44 as the set screw 56 was tightened. The grooved formations 90, 92 are preferably circular in cross section, as illustrated in FIG. 28, so as to enable the use of a cylindrical keying pin. The remaining details of the construction of FIG. 27 are similar to those of FIG. 1, and accordingly need not be repeated.

Another embodiment of the invention is illustrated in FIG. 29, showing a reversing nut generally designated by the numeral 28e which is mounted for rotation on end bearings 98, 100 carried on upright supports 102, 104, respectively. The latter in turn are mounted on a base member 106. Also carried on the base is an electric motor 108 having its shaft connected with a pinion 110, the latter being adapted to drive a gear 112 which is carried by the reversing nut 28e. Cooperable with the nut is a diamond thread screw 114 which extends through the hollow bore 32e of the nut 28e. The right-hand portion of the screw 114 in FIG. 29 is received in a cylinder 116 which is provided with a plunger or piston 118, the cylinder having inlet and outlet ports 120, 122 which may be connected to suitable check valves (not shown) or the like. The construction of the reversing nut 28e is substantially identical to that of the nut 28 illustrated in FIG. 1, with the exception that the slide portion 88 in FIG. 1 has been omitted, and a gear 112 and bearings 98, 100 added to thereby enable the nut to rotate and be power driven. In this embodiment, the diamond thread screw 114 is non-rotating, but instead reciprocates between end limits determined by the locations of reversing grooves thereon similar to those designated 82, 84 in FIG. 13.

As the motor 108 is energized, turning movement is imparted to the nut 28e through the gears 110, 112. It will be seen that such rotation gives rise to reciprocating movement of the diamond screw 114 and the piston 118. This in turn gives rise to a pumping action between the inlet and outlet ports 120, 122, respectively through suitable check valves (not shown) which are arranged to operate in synchronism when the direction of the reciprocating stroke is reversed. Suitable means such as a spline arrangement (not shown) can also be provided for preventing the diamond thread screw 114 from rotating as the nut is turnably driven.

Still another embodiment of the invention is illustrated in FIGS. 30 and 31, showing a diamond thread screw generally designated by the numeral 124, the latter having criss-crossed grooves 126, 128. In accordance with the present invention, there is provided an end or reversing groove 130 for engagement with the balls of a reversing nut such as that illustrated in FIG. 1, the groove 130 being characterized by a portion of zero pitch. Such a construction will give rise to a momentary dwell of the reversing nut at one end of its reciprocating stroke. Assuming that a nut similar to that of FIG. 1 is being employed with the diamond thread screw of FIGS. 30 and 31, and with the screw rotating in the direction indicated in FIG. 30, it will be seen that the leading ball 36 will be the first to engage the groove 130 of zero pitch. As this is done, the balls 34, 38 operate in such a way as to maintain the movement of the nut toward the right, which has the effect of shifting the leading ball 36 toward the left with respect to the nut. Such movement ceases when the ball 34 reaches the linear portion of the groove 130. It can be understood that for the following 180° of revolution, during which the ball 34 occupies the linear portion of this groove, the nut will not undergo further axial movement. Shifting of the leading ball 36 toward the left has already begun, due to its engagement with the groove 130. As the dwell terminates, it can be seen that the ball 36 will have been completely shifted to its left-hand extreme position with respect to the nut, with the ball 38 having been partially shifted toward its right-hand extreme position, also with respect to the nut. This latter ball will be completely shifted by the time the ball 34 arrives at the next intersection of grooves 126 and 128. By this arrangement, a reversal has been effected, with the inclusion of a 180° dwell of the nut at the right end of its reciprocating stroke.

From the foregoing it will now be understood that the nut 28 of FIG. 1 can traverse the diamond thread screw 18 from one end to the other, and then automatically reverse its direction and proceed back to the first end, and so on, all without requiring reverse turning of the screw. During the travel of the nut in either of its two axial directions, the load will always be carried by at least one ball. For a given sense of rotation of the screw with respect to the nut, only two balls are required to produce an operative device. For the conditions of FIG. 1, the balls 34, 36 carry the load, and the trailing ball 38 could accordingly be omitted. If the direction of rotation of the screw were reversed, however, balls 34 and 38 would carry the load, and the trailing ball 36 could be omitted. In the interest of making a complete disclosure, at least three balls have been shown in the devices discussed above.

By virtue of the fact that the load is always carried by at least one ball, there is no irregularity of movement or interference at the crossover points of the threads. For such condition the load will be fully sustained by the remaining ball until the crossover point has passed, after which two balls will again divide the load. Therefore, there is continuity in sustaining any load which may be applied to the nut 28. Even at the end of its movement in either direction, the nut will continue to have a smooth transition due to the fact that the ball 34 continues to carry the load as it traverses either reversing groove portion 82 or 84.

By virtue of the foregoing construction and operation the nut 28 experiences a smooth movement at all times, regardless of the presence of the crossover points in the diamond thread. The shifting of one or the other of the direction-reversing balls requires relatively little force to overcome the resilient detent action of the wave washer. Such small force is not noticeable during normal operation of the traversing device, yet the detent action of the rings is effective at all times to maintain the shiftable balls in their proper, operative positions.

The provision of the spring rings not only effects a desirable simplicity and economy in the traverse construction, but also makes for fool-proof operation since such rings directly engage the balls with no intermediary parts, and since the forces and masses involved with controlling the shifting of the balls are extremely small and involve simple movements. The direct engagement of the rings with the balls thus constitutes an important feature of the present invention.

It will now be seen from the foregoing that I have provided a unique, especially simple and workable mechanical traverse device employing a diamond thread screw, wherein simple ball elements constitute the load carrying members and also effect the reversal of the traversing nut. The construction is capable of being fabricated by simple manufacturing operations, is especially small and compact and is capable of handling substantial loads with high reliability over extended periods of operation where adequate lubrication is provided for the relatively movable surfaces. The device is thus seen to represent a distinct advance and improvement in the technology of traverse mechanisms.

Variations and modifications are possible without departing from the spirit of the invention.

I claim:

1. A reversing nut for use with a diamond thread screw having threads defining criss-crossed grooves, comprising in combination:
   a. a nut body having a through opening to receive the screw,
   b. a ball engaging a wall of one groove of the screw,
   c. means mounting the ball against lateral movement thereof on the body, said ball extending into the body opening for said groove wall engagement,
   d. a laterally movable ball carried by the body, said ball extending into the opening thereof for engagement with a wall of a groove of the screw,
   e. means providing a slot in the body in which the movable ball is disposed, for enabling said movable ball to be translationally shifted in directions along the body axis whereby, while guided and directly engaged by the slot walls it can transfer from direct engagement with one groove wall of the screw and simultaneous direct engagement with one slot end, to direct engagement with another groove wall of the screw and simultaneous direct engagement with the other slot end, thereby to effect a change in the axial direction of travel of the nut with respect to the screw, and
   f. springs for directly engaging the movable ball to yieldably hold it against either one slot end or else the other slot end.

2. The invention as defined in claim 1, and further including:
   a. a second laterally movable ball carried by the body and extending into the opening thereof for engagement with the walls of the screw grooves, and
   b. means providing a second slot in the body in which said second laterally movable ball is disposed, for enabling said second ball to be shifted in directions substantially parallel to the body axis, from direct engagement with one groove wall of the screw and simultaneous direct engagement with one end of said second slot to direct engagement with another groove wall of the screw and simultaneous direct engagement with the other end of said second slot,
   c. said movable balls being circumferentially spaced from one another.

3. The invention as defined in claim 2, wherein:

a. said laterally movable balls are circumferentially spaced apart unequal distances about the periphery of the nut body.

4. The invention as defined in claim 1, wherein:
a. said springs selectively bias said movable ball into engagement with different walls of the grooves of the screw.

5. The invention as defined in claim 1, wherein:
a. said nut body comprises a housing and a cage,
b. said cage being annular and having a radially extending opening constituting said slot,
c. said cage being telescopically received in the housing, a portion of the walls of said housing constituting a socket for the movable ball, and
d. means for securing the cage in the housing in said telescoping relation.

6. The invention as defined in claim 5, wherein:
a. said securing means comprises a pair of cooperable annular abutment shoulders on the cage and housing respectively, said housing having an annular groove on its inner surface, and
b. a retainer ring adapted to be snapped into said groove so as to engage the cage and hold the latter captive.

7. The invention as defined in claim 6, wherein:
a. said securing means further comprises a set screw received in a radially extending hole of the housing and engaging the wall of the cage as the latter is being held in place by the retainer ring.

8. The invention as defined in claim 6, wherein:
a. the housing has an axially extending furrow on its inner surface,
b. the cage having an axially extending furrow on its outer surface,
c. said furrows, when juxtaposed, defining mating halves of a key slot,
d. said securing means comprising a pin disposed in said key slot, said pin preventing relative turning movement between the housing and the cage.

9. The invention as defined in claim 1, and further including:
a. a diamond thread screw,
b. said screw having a reversing groove at one end, adapted to be engaged by said laterally movable ball as the nut body moves toward the groove,
c. said movable ball being capable of shifting axially of the body between oppositely disposed extreme positions engaging the ends of the slot,
d. said reversing groove effecting a shifting of said movable ball from one of its extreme positions to the other in response to axial movement of the body past a predetermined point along the length of the screw.

10. The invention as defined in claim 1, and further including:
a. a diamond thread screw,
b. said screw having criss-crossed right and left-hand grooves, each characterized by a particular pitch,
c. the pitch of one of the grooves being less than that of the other of the grooves wherein, for a given rate of relative rotation between the nut body and the screw, the rate of axial traversal of the nut body in one direction is different from the rate of traversal in the other direction.

11. The invention as defined in claim 1, and further including:
a. a base,
b. a diamond thread screw,
c. means carried by the base for mounting the diamond thread screw for reciprocating movement along a predetermined axis over the surface of the base,
d. means carried by the base for mounting the nut body for rotation about said axis, and
e. drive means connected with said nut body for imparting turning movement thereto,
f. said screw undergoing reciprocating movement in response to rotation of said nut body.

12. A reversing nut for use with a diamond thread screw having threads defining criss-crossed grooves, comprising in combination:
a. a nut body having a through opening to receive the screw,
b. a thread-engaging ball,
c. means mounting the ball against lateral movement thereof on the body, said ball extending into the body opening for engagement with the screw threads,
d. a laterally movable ball carried by the body, said ball extending into the opening thereof for engagement with the screw threads, and
e. guide means on the body for enabling said movable ball to be translationally shifted in directions along the body axis whereby it can transfer from engagement with one groove wall to engagement with another groove wall of the screw, thereby to effect a change in the axial direction of travel of the nut with respect to the screw, and
f. a roller bearing carried by the nut body and disposed between the latter and the screw to minimize sliding friction therebetween as the two parts rotate with respect to one another.

13. The invention as defined in claim 12, wherein:
a. said roller bearing is disposed near one end of the nut body, and
b. a second roller bearing carried by the nut body near the other end thereof, and engageable with the screw to thereby additionally reduce sliding friction between the two parts as they rotate with respect to one another.

14. A reversing nut for use with a diamond thread screw having threads defining criss-crossed grooves, comprising in combination:
a. a nut body having a through opening to receive the screw,
b. a thread-engaging ball,
c. means mounting the ball against lateral movement thereof on the body, said ball extending into the body opening for engagement with the screw threads,
d. a laterally movable ball carried by the body, said ball extending into the opening thereof for engagement with the screw threads, and
e. guide means on the body for enabling said movable ball to be translationally shifted in directions along the body axis whereby it can transfer from engagement with one groove wall to engagement with another groove wall of the screw, thereby to effect a change in the axial direction of travel of the nut with respect to the screw, and
f. yieldable detent means engageable with said laterally movable ball for yieldably holding the latter in either of two spaced-apart predetermined positions on the nut body,
g. said nut body comprising a housing and a cage adapted to be telescopically received therein, h. said cage having a substantially annular groove extending about its periphery,
i. said yieldable detent means comprising a spring ring received in said groove and being engageable with the movable ball to thereby hold the latter in one extreme position.

15. The invention as set forth in claim 14, wherein:
a. said cage has an additional substantially annular groove extending about its periphery and being axially spaced from the first groove,
b. said yieldable detent means comprising a second spring ring received in the additional groove and being engageable with the movable ball to thereby hold the latter in a second extreme position.

16. The invention as set forth in claim 14, wherein:
a. said housing is tubular and has an annular groove on its inner wall,
b. said housing annular groove providing a clearance space to enable momentary movement of a portion of the spring ring in a radially outward direction.

17. The invention as set forth in claim 15, wherein:
a. said housing is tubular and has an annular groove on its inner wall,
b. said housing having an additional annular groove on its inner wall, axially spaced from the first groove,
c. said additional housing groove providing a clearance space to enable momentary movement of a portion of the second spring ring in a radially outward direction.

18. The invention as set forth in claim 14, and further including:
a. a second laterally movable ball carried by the body, said second ball extending into the opening thereof for engagement with the screw threads,
b. additional guide means enabling said additional movable ball to be translationally shifted in directions substantially parallel to the body axis whereby it can transfer from engagement with one groove wall to engagement with another groove wall of the screw,
c. said spring ring being engageable with both of said movable balls, one at a time, thereby being capable of holding either ball in an extreme position with respect to the body.

19. The invention as set forth in claim 18, and further including:
a. a second spring ring carried by the nut body, and being engageable with both of said movable balls, one at a time, to thereby hold either in oppositely disposed extreme positions in respect to said body.

20. The invention as set forth in claim 14, wherein:
a. said annular groove comprises an abutment portion engageable with opposite ends of the spring ring in order to prevent the latter from shifting circumferentially within the groove.

* * * * *